United States Patent [19]

Troy

[11] 4,113,063
[45] Sep. 12, 1978

[54] MECHANICAL STORED ENERGY POSITIONING ACTUATOR

[75] Inventor: M. Frank Troy, Hinsdale, Ill.

[73] Assignee: Vapor Corporation, Chicago, Ill.

[21] Appl. No.: 748,058

[22] Filed: Dec. 6, 1976

[51] Int. Cl.² .............................................. F03G 1/00
[52] U.S. Cl. .................................... 185/40 R; 251/69; 74/2; 74/625
[58] Field of Search ........................ 74/520, 99, 625, 2; 49/26; 251/68, 69, 70, 71; 185/40 R

[56] References Cited

U.S. PATENT DOCUMENTS

| | | | |
|---|---|---|---|
| 3,158,174 | 11/1964 | Stalnecker et al. | 251/68 |
| 3,518,891 | 7/1970 | Denkowski | 251/69 |
| 3,685,791 | 8/1972 | Czuszak et al. | 251/69 |
| 3,788,596 | 1/1974 | Maeda | 74/520 |

FOREIGN PATENT DOCUMENTS 855,813  12/1960  United Kingdom ........................ 49/26

*Primary Examiner*—Benjamin W. Wyche
*Assistant Examiner*—Wesley S. Ratliff, Jr.
*Attorney, Agent, or Firm*—Francis J. Lidd

[57] ABSTRACT

A motor driven actuator, providing continuous positioning of an output shaft, and employing energy storage which allows the shaft to return to a predetermined position on failure of the input power source or other predetermined occurrence. Drive motor torque requirements are minimized through sequential application of input torque to the energy storage and actuator load. This arrangement insures that adequate energy storage for return of the output shaft is continuously available during normal actuator operation including alternate output shaft positioning.

When utilized to operate a fluid control valve, the valve actuator combination provides a fail-safe valve which under emergency or other prescribed conditions provides return of the valve to a safe condition from any normal operating position throughout the limit of the valve travel.

The above functions are provided through the use of a simple highly reliable structure utilizing a reduced number of relatively simple components and a drive motor which can be sized for the output torque alone without additional torque requirements due to the presence of a stored energy device.

14 Claims, 9 Drawing Figures

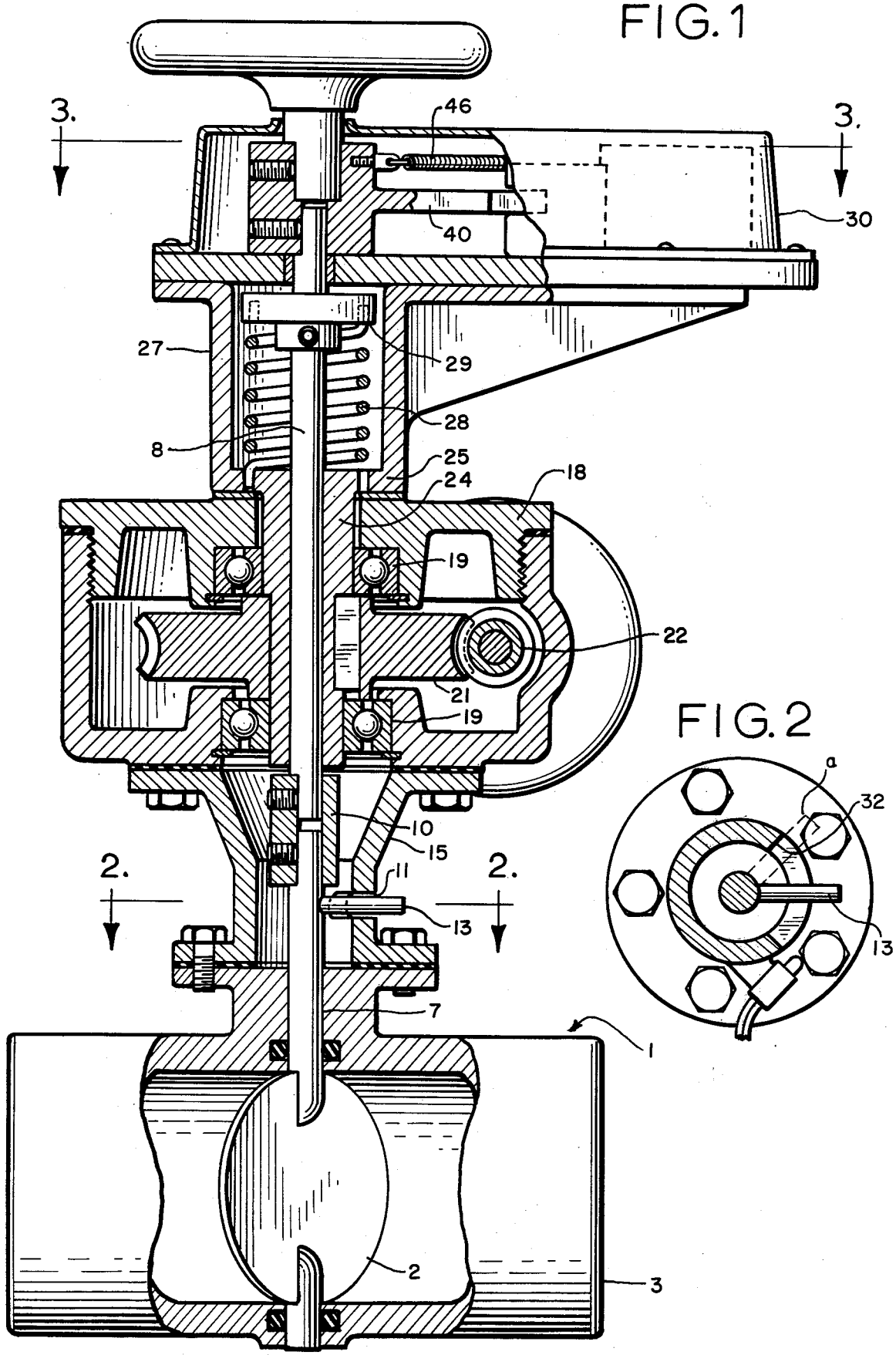

FIG. 6
FIG. 9
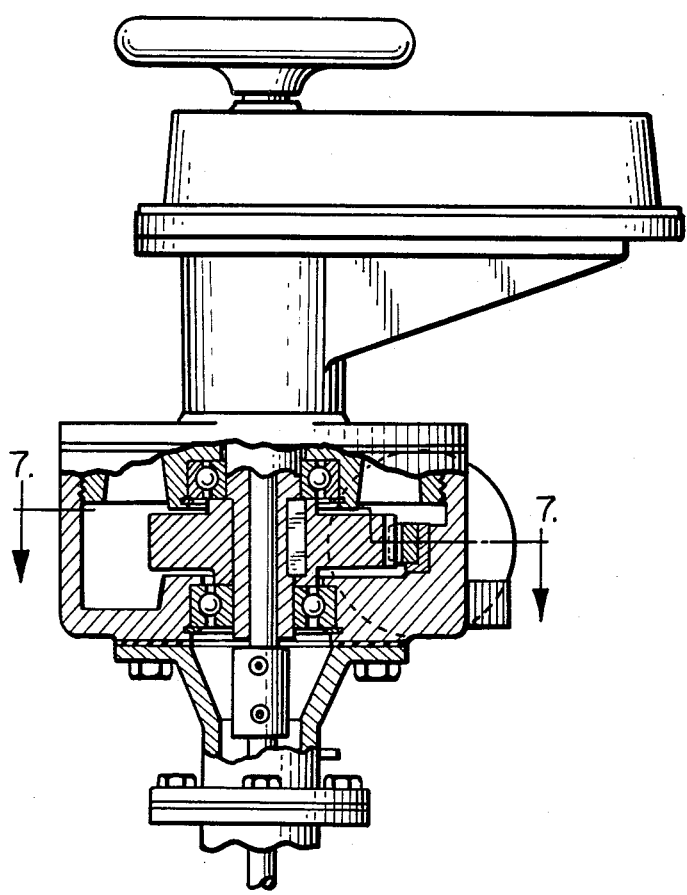
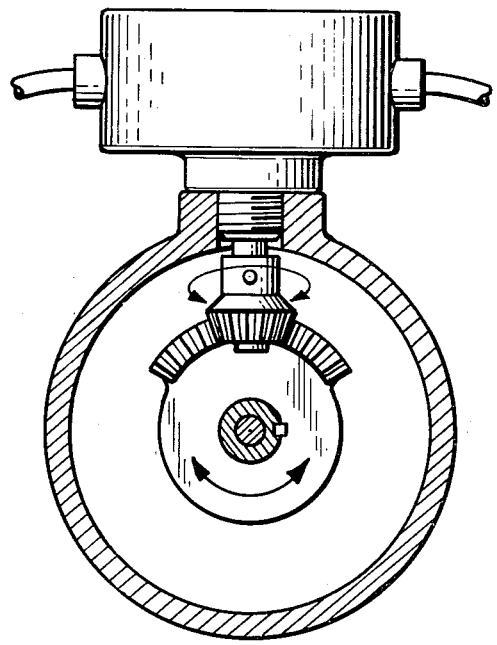
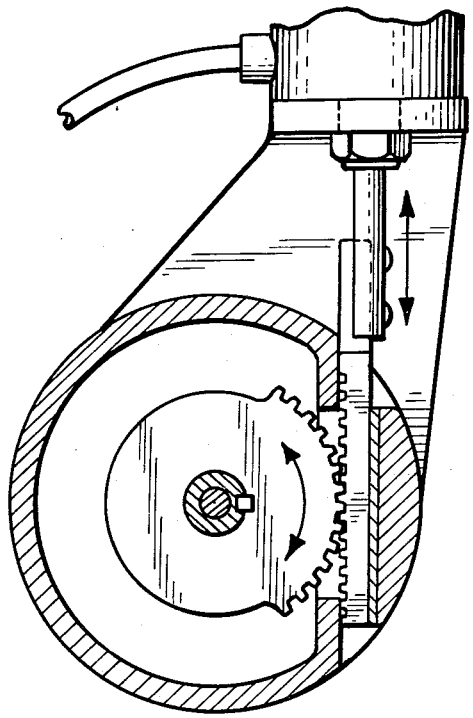
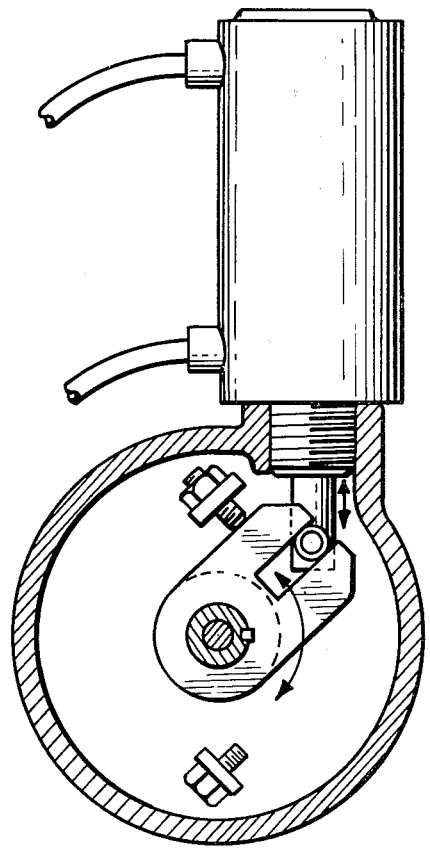
FIG. 7
FIG. 8

MECHANICAL STORED ENERGY POSITIONING ACTUATOR

FIELD OF THE INVENTION

Generally speaking, this invention pertains to mechanical actuators employing drive motors and torque increasing elements such as levers or gears. More particularly, the invention disclosed here contemplates the use of a motor actuator having stored energy which provides for a return of the output shaft to a safe or other predetermined position during an emergency or other unusually occurring situations.

Generally speaking, rotary mechanical actuators are used in a variety of devices such as door openers, lifting or cable winding devices, actuating or turning fluid control valves of various types. The valves under consideration can be, as will be recognized by those skilled in the art, either butterfly, plug, or certain forms of gate or guillotine valves.

In general, the actuator contemplated here can be driven by electrical motors or other rotary power sources as hydraulic or pneumatic motors or even internal combustion motors of special types. Other sources of drive torque for actuators include pneumatic cylinders, and hydraulic cylinders either operated from available fluid power sources or self-contained through the use of high pressure accumulators such as compressed air tanks or hydraulic accumulators.

DESCRIPTION OF PRIOR ART

Actuators of the class disclosed in this invention are typified by U.S. Pat. Nos. 3,808,895, 3,430,916, and 3,279,744. The valve-actuator combinations disclosed in these patents individually utilize mechanical springs as stored energy devices. However, each requires that prime mover provides sufficient output torque to store energy simultaneously with operating the valve in one direction or another. This requirement, while providing a "fail-safe" valve, raises the torque requirements of the drive motor necessitating either an increased size motor or substantially reduced operating time and/or efficiency due to a greater number of mechanical torque increasing devices, such as gears or levers. An additional and more serious shortcoming of the above devices is the necessity to confine fail-safe features to either full-opened or full-closed positions of the valve. In these devices, due to the simultaneous torque requirements of the load and energy storage means, it is not possible to position the output shaft or valve member when used as valve actuator, other than full-open or full-closed. Therefore, it is not possible to provide "fail-safe" operation in a positioning actuator, or modulating valve. An additional shortcoming of these inventions is the utilization of electrical or mechanical clutches, dogs, seers or other latching methods to retain the energy storage spring in a full storage condition. These devices provide high loading of the contact surfaces and generally speaking result in shortened life through increased wear of the contact and/or actuating surfaces.

SUMMARY OF THE INVENTION

Therefore, it is the object of the invention disclosed to provide a rotary high-torque actuator providing automatic return to a preset location on the occasion of a power failure or other prescribed condition.

It is a further object of this invention to provide a rotary high torque actuator capable of positioning the output shaft while containing sufficient stored energy for subsequent return to a prescribed shaft position.

A further object of this invention is to provide a motor driven stored energy valve actuator allowing modulation of the driven valve and automatic return to a prescribed valve position such as open or closed on occasion of loss of power or other inadvertent failure.

It is a still further object of this invention to provide a motor driven high torque valve actuator providing fail-safe valve operation in addition to continuous valve element positioning with a minimum number of parts, and without the use of complicated clutches, seers, or mechanical dogs.

It is a still further object of this invention to provide a rotary stored energy high torque actuator having continuous output shaft positioning where the input torque requirements are limited to load torque during the positioning operation.

It is a still further object of this invention to provide a rotary high torque valve actuator having stored energy sufficient to return the valve to a safe or other prescribed position wherein the input drive torques are exclusively limited to energy storage, and output load in sequence.

BRIEF DESCRIPTION OF THE DRAWINGS

FIG. 1 is a section view of the actuator disclosed, shown operating a butterfly valve, and indicating the functioning parts.

FIG. 2 is a partial section view of the adapter housing, particularly showing the operating valve stop.

FIG. 6 is a partial view of an alternate embodiment of the invention showing a valve actuator powered a pneumatic cylinder and rack and pinion drive.

FIG. 7 is an additional partial view of the alternate embodiment of FIG. 6 showing in further detail the actuator powered by a pneumatic cylinder and rack and pinion gearing.

FIG. 8 is a partially sectioned view of an alternate embodiment of the invention wherein the valve actuator is powered by a pneumatic cylinder and a scotch yoke drive.

FIG. 9 is a partially sectioned view of an alternate embodiment of the invention wherein the valve actuator is powered by a rotary hydraulic motor and a worm gear drive.

DETAILED DESCRIPTION OF OPERATION

Figure 3:
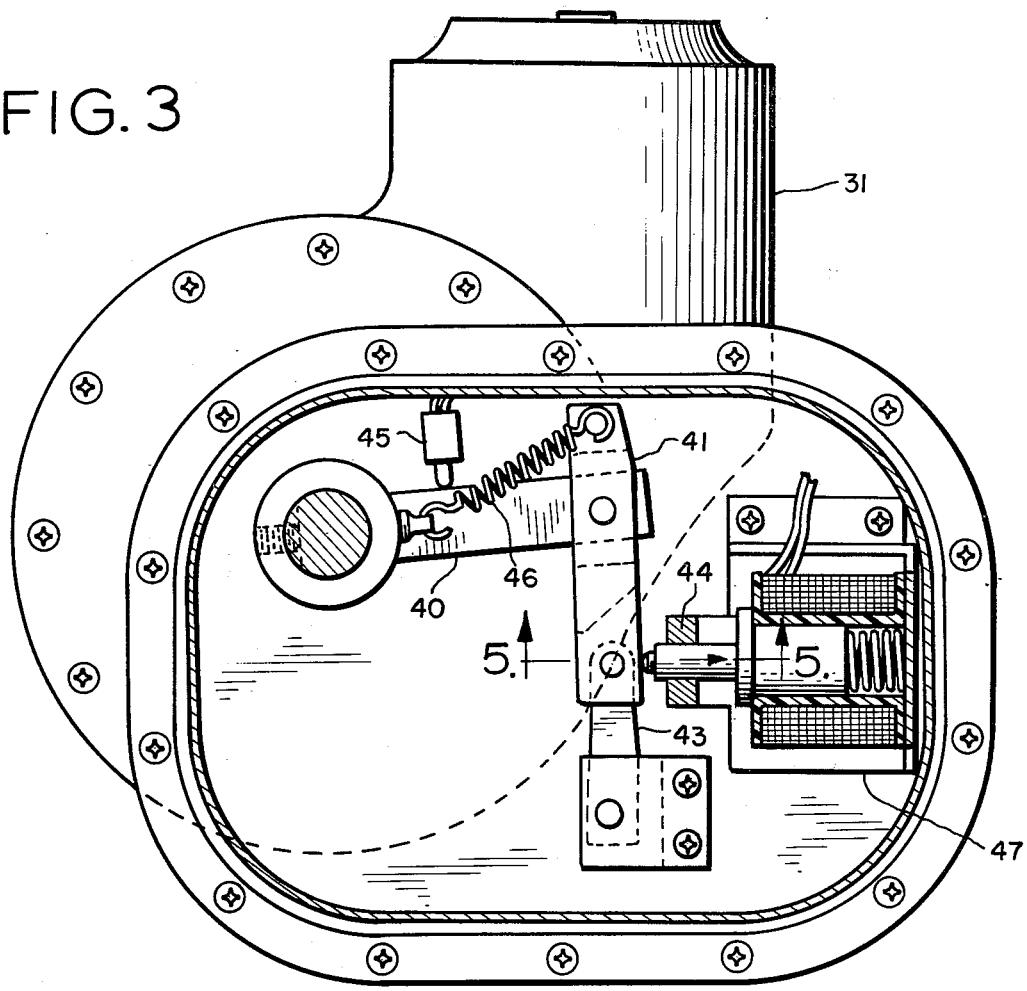
FIG. 3 is a top view of one embodiment of the latch mechanism showing relative location of the operating shaft, and release solenoid.

In reference to FIG. 1 the actuator of this invention is shown driving a convention butterfly valve ball, although those skilled in the art will realize that other valves such as ball or cylindrical plug types can be utilized equally as well. Therefore, the valve having a closure member 2 contained in FIG. 1 and a valve housing 3, the closure member driven by the valve operations shaft 7. The valve actuator shaft 8 is coupled to the valve operating shaft 7 by means of a coupling 10 which may be any one of a large number of shaft couplings which will be well known to those skilled in the art. A stop or limit 13 projects from the operating shaft and, as will be seen in FIG. 2 abuts a cutout 11 in the valve adapter limiting valve travel to a predescribed number of degrees as dictated by the type of valve being driven. The drive gear or torque multiplier 21 is fixed to the gear or output shaft 24 and the spring housing 27, and driven by the input drive gear 22. In this case the drive system comprising the drive gear and input drive gear are of the well-known worm drive configuration, however other gear and friction drive systems can be utilized as will be appreciated by those familiar with the gear art. The gear or output shaft 24 and spring housing 27 are journaled into the drive motor housing 18 by means of bearings 19 providing relative motion between the spring and drive motor housings 27 and 18. As will be appreciated by those skilled in the art, seals may be required between the gear shaft and housing depending on the type of gears and the lubricant used. As these are not of primary importance in the invention disclosed, they are omitted for the sake of clarity. The gear or output shaft 24 has an upwardly projecting flanged portion 25 which is a part of the torsion spring housing 27. It should be noted that the actuator shaft 8 passes freely through the gear shaft and spring housing terminating in the latch housing 30 located above and attached to the spring housing. A spring disc 29 is solidly fixed to the operator shaft and retains the upper end of the torsion spring 28. The lower end of the torsion spring is attached to the upper surface of the lower edge of the spring housing as shown. Therefore relative motion between the gear or drive motor housing 18 and spring housing 27 is restrained by the spring 28.

In operation the drive gear 22 is rotated in a plane perpendicular to the view shown by drive motor 31 (Ref. FIG. 3). The driven gear 21 therefore rotates in a plane parallel to the surfaces of the gear or output housing imparting a rotary motion to the gear or output shaft 24 and spring housing 27 through the upper flange 25 contained on the shaft 24. As the actuator drive shaft 8 turns freely in the gear shaft and spring housing depending on the spring preload and turning resistance provided by the valve closure member and latching mechanism, rotation of the gear 21 will move the valve stop 13 to the position a shown in FIG. 2. It should be appreciated that this position is predetermined and chosen based on requirements for valve travel and/or fail-safe closure location, and will vary from application to application. For the purposes of this disclosure the valve position when the valve stop pin 13 contacts the edge 32 of the valve stop groove milled into the adapter housing 15 as shown in FIG. 2, the valve will be assumed to be in the fully closed position.

Due to the aforementioned free turning of the shaft 8 the actuator drive gear 21 continues its rotary motion although the valve closure member will be restrained by the valve limit or stop pin 13 mentioned above. At this point the end of torsion spring 28 contained in flange 25 is rotated about its axes by the relative motion now occurring between the spring housing 27 and the spring disc 29 now restrained through the solid connection between the disc 29 and the valve actuator shaft 8. The shaft 8 is restrained due to the valve closure element 13 abutting its stop 32.

Figure 4:
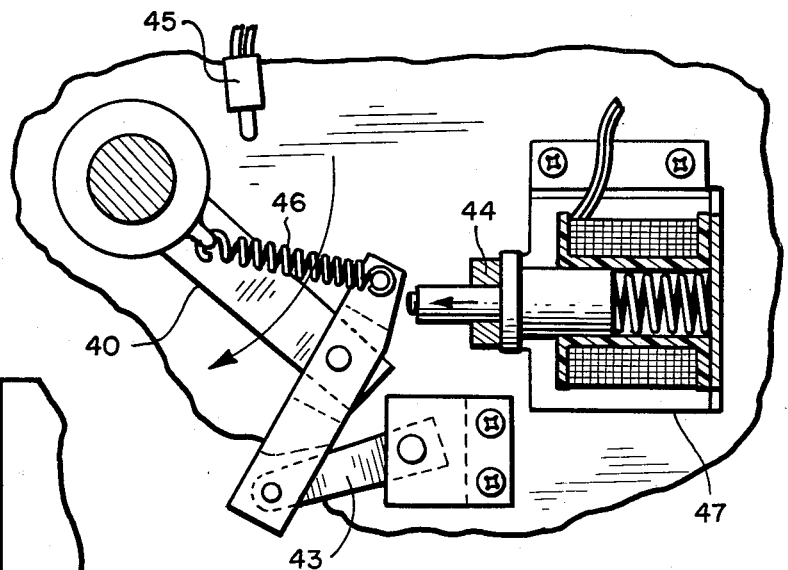
FIG. 4 is a partial view of the latch wherein the operating lever is positioned in partial return after release of the latch.
Figure 5:
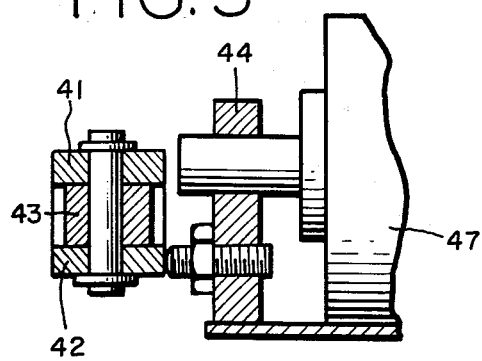
FIG. 5 is a further partial view of the links and solenoid release of the latch.

It should be appreciated that at this time the latching mechanism 31 reference FIG. 3, containing an output lever 40 rotated by the upper extension of the actuator drive shaft 8 projecting into the latching mechanism housing. As will be seen in FIG. 3 the combination of the upper link 41 and the lower link 42 with opposing link 43 and the solenoid operating rod 44 act to restrain the rotation of the actuator drive shaft and therefore the valve closure element such that in the full closed position it is as shown in FIG. 3 and the partially open position as shown in FIG. 4. Operation of the latch mechanism is as follows:

With the valve closure element partially away from its stop, the location of the output lever 40 is as shown in FIG. 4. As the spring 28 is torsionally compressed as described above the rotation of element 40 proceeded to the position of FIG. 3. At this point limit switch 45 is actuated by the output lever resulting in reversal of the motor 31. Positioning of the links 40, 43, 41 and 42 aided by spring 46 establishes a latch which prevents further rotation of the actuator shaft 7 in the counterclockwise direction.

At this point the torsional spring has stored sufficient energy to move the valve closure element through its full stroke as required by the type of valve and emergency operation desired. Rotation of the drive gear 21 in the opposite direction results in rotation of the valve shaft 7 and the spring housing 27 since at this time relative motion between 27 and the valve shaft is prevented by the latch mechanism contained in the latch housing 31, fixed to the spring housing providing a reaction member for the latch and spring consisting of the latch and spring housings, allowing the output shaft 24 to drive the valve shaft 8 through the spring and latch housing in parallel, mechanically with the spring 28. It should be noted that operation of the limit switch 45 reverses the rotation of the drive motor 31 so that the valve drive system having stored sufficient energy to move the valve through its trajectory now proceeds in the opposite direction or clockwise in the view of the latch mechanism as shown on FIG. 3.

Therefore, further rotation of the drive gear proceeds in the opposite direction and only requires normal frictional and closure member torque for further valve operation and/or modulation. If at any time during this valve operation, a power failure should occur or other emergency operation necessitates returning the valve to the fully closed position, it is only necessary to actuate the solenoid 47 which immediately releases the links 40, 41, 42 and 43 allowing the output lever 42 to proceed to the initial position as shown in FIG. 3. The actuating force is provided by the compressed or stored energy of the spring 28. As disclosed an electrical solenoid is shown actuating the release mechanism. However as will be obvious to those skilled in the art, actuating devices equivalent to the electrical solenoid 44 can easily be utilized to release the latch mechanism and return the valve to a safe or predetermined position.

Although not shown, a conventional reversing electrical motor and control circuit can be used to reverse rotation on a signal from limit switch 45. Similarly the signal from switch 45 energizes the solenoid 47. It will be obvious to those skilled in the art that other forms of circuitry such as hydraulic or pneumatic could be utilized to provide identical functions. It should further be noted that the concept of requiring the drive motor to provide sequential and exclusive energy storage and valve operating torques remains in all equivalent latching circuits.

Thus it is apparent that there has been provided in accordance with the invention a stored energy valve actuator providing continuous actuator positioning and valve motion and sequential storage and operating torque as fully satisfied the object, aims and advantages set forth above. While the invention has been described in conjunction with specific embodiments thereof it is evident that many alternatives, modifications and variations will be apparent to those skilled in the art in the light of the foregoing description. Accordingly, it is intended to embrace all such alternatives, modifications and variations as fall within the spirit and broad scope of the appended claims.

Therefore, I claim the following:

1. In a rotary mechanical valve actuator having a reversible drive motor, and a torque multiplier for furnishing in non-overlapping sequence, load and storage torque to an output shaft;

means storing in a predetermined amount of drive motor energy and torque intermediate said multiplier and output shaft during prescribed motion relative said multiplier and shaft;

means limiting output shaft travel and torque, providing said relative motion in one direction thereby storing said predetermined energy;

means signaling output shaft travel;

means actuated by said signal selectively and releasably locking said multiplier and shaft to limit said relative motion and retain said stored energy;

means actuated by said signal means reversing the drive motor;

wherein the drive motor provides reversible rotary output shaft load torque over a prescribed amount of shaft rotation, and, on release of said latch and/or loss of motor torque said storage provides unidirectional torque, to return the shaft to a predetermined position.

2. The actuator described in claim 1 wherein the storage means includes a helical mechanical spring.

3. The actuator of claim 1 wherein said latch includes an electromagnetic clutch.

4. The actuator described in claim 1 wherein said reversible drive motor is an electric single phase and said torque multiplier is a worm gear drive.

5. The actuator described in claim 1 wherein the reversible drive motor is a pneumatic cylinder and the torque multiplier is a rack and pinion drive.

6. The actuator described in claim 1 wherein the reversible drive motor is a hydraulic motor and the torque multiplier is a worm gear drive.

7. A rotary mechanical valve actuator having;
a reversible motor;
a torsional spring having upper and lower ends;
a torque multiplier driven by said motor having an output shaft and a housing, said shaft attached to said spring lower end;
a valve operating shaft having first and second ends, said first end attached to said spring upper end and said second end coupled to a valve;
means indicating a predetermined position of said output shaft, relative said operating shaft;
means responsive to said indicating means for signaling and reversing said motor;
a latch responsive to said signal means for selectively and releasably limiting said output shaft motion relative said operating shaft to a predetermined value;
a stop, limiting travel of said valve operating shaft relative said output shaft;
wherein said drive motor and torque multiplier shaft, in sequence rotate said output shaft in a first direction thereby rotating said spring and operating shaft toward said stop, and, said shaft abutting said stop, winding said spring, actuating said signal means, and latching said output and operating shafts, thereby preventing further winding of said spring, and reversing said motor for rotation in a second direction;
and, said output shaft provides torque to the valve operating shaft in first and second directions;
whereupon loss of motor torque and latch signal said latch releases said shafts, allowing said spring to unwind, returning said output shaft to its original position.

8. The valve actuator described in claim 7 wherein a reversible drive motor is a pneumatic cylinder and the torque multiplier is a rack and gear.

9. The valve actuator described in claim 7 wherein the drive motor and torque multiplier are a rotary electric motor and a worm gear drive.

10. The valve actuator described in claim 7 wherein the drive motor and torque multiplier are a rotary hydraulic motor and a spur gear set.

11. In a rotary valve actuator of the type employing a reversible drive motor and a torsional spring for storing rotational energy, providing bidirectional valve operation, and on signal and/or loss of power to the actuator, returning the valve to a predetermined position, the improvement comprising;

an output shaft on said drive motor fixed to one end of said spring;

a valve shaft having upper and lower ends, movably contained and concentric with said output shaft;

a reaction member, having one end attached to said output shaft adjacent to said spring attachment;

a drive motor housing intermediate said spring reaction member and valve, containing said output and valve shafts, said housing upper end in rotatable abutment with said output shaft, adjacent said spring attachment;

a disk, fixed to the other end of said spring, and attached to said valve shaft, adjacent said valve shaft upper end, whereby, on rotation of said output shaft, said spring member, spring and disk rotate said valve shaft;

a stop, fixed to said valve shaft lower end limiting travel of said valve shaft relative to said drive motor housing, wherein valve shaft rotation in one direction turns the valve shaft against said stop, and further rotation in said one direction rotates said reaction member relative said valve shaft, winding said spring, and storing rotational energy in said spring;

means indicating a predetermined position of said output shaft relative said valve shaft, indicating a predetermined amount of stored energy in said spring;

means responsive to said indicating means for signaling and reversing said drive motor;

a latch fixed to said reaction member other end responsive to said signal means for providing a releasable mechanical connection between said valve shaft and reaction member, thereby driving said shaft through said latch, providing bidirectional rotation over a predetermined amount of rotation;

wherein, on loss of drive motor power and/or receipt of a predetermined signal, said latch releases the connection between said reaction member and valve shafts, and the stored energy in said spring turns said valve shaft relative to said reaction member and output shaft returning said valve shaft to a predetermined position.

12. The actuation of claim 11 wherein the drive motor is a pneumatic cylinder.

13. The actuator of claim 11 wherein the drive motor is a reversible electric motor and gear train.

14. The actuator of claim 11, wherein the reaction member consists of spring and latch housings.

* * * * *